United States Patent [19]
Haferl

[11] Patent Number: 5,945,791
[45] Date of Patent: *Aug. 31, 1999

[54] HIGH VOLTAGE SYSTEM

[75] Inventor: Peter Eduard Haferl, Adliswil, Switzerland

[73] Assignee: RCA Thomson Licensing Corporation, Princeton, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/770,098

[22] Filed: Dec. 19, 1996

[51] Int. Cl.$^6$ .............................. G09G 1/04; H01J 29/70
[52] U.S. Cl. ........................................ 315/371; 315/411
[58] Field of Search ................... 315/371, 387, 315/411

[56] References Cited

U.S. PATENT DOCUMENTS

| | | | |
|---|---|---|---|
| 4,184,104 | 1/1980 | Shouse, Jr. ............................ | 315/371 |
| 4,206,388 | 6/1980 | Ishigaki et al. ....................... | 315/371 |
| 4,645,984 | 2/1987 | Sutherland et al. .................. | 315/371 |
| 4,827,194 | 5/1989 | Fernsler ................................ | 315/371 |
| 5,019,754 | 5/1991 | Onozawa et al. .................... | 315/408 |
| 5,266,871 | 11/1993 | Haferl ................................... | 315/411 |
| 5,399,945 | 3/1995 | Haferl ................................... | 315/371 |

FOREIGN PATENT DOCUMENTS 4137656   5/1993   Germany ........................ H04N 3/16

*Primary Examiner*—Gregory C. Issing
*Attorney, Agent, or Firm*—Joseph S. Tripoli; Joseph J. Laks

[57] ABSTRACT

A sample of the high voltage retrace pulse is modeled across the series connection of a coil and low voltage winding of the flyback transformer. The AC current of the high voltage winding is fed through the coil in order to obtain the same retrace voltage shape as across the high voltage winding. Thus in this manner modeled high voltage retrace pulse is rectified by a diode and a charge capacitor. The rectified voltage is loaded by the beam current by a load resistor. The loading produces excellent tracking between the high voltage and the high voltage sample.

23 Claims, 6 Drawing Sheets

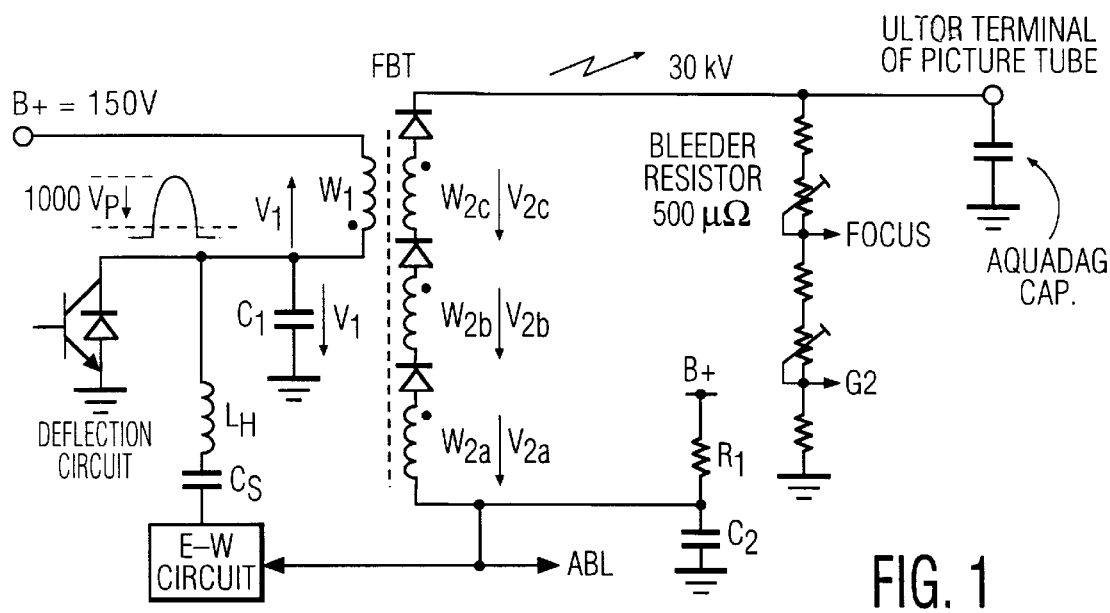
FIG. 1
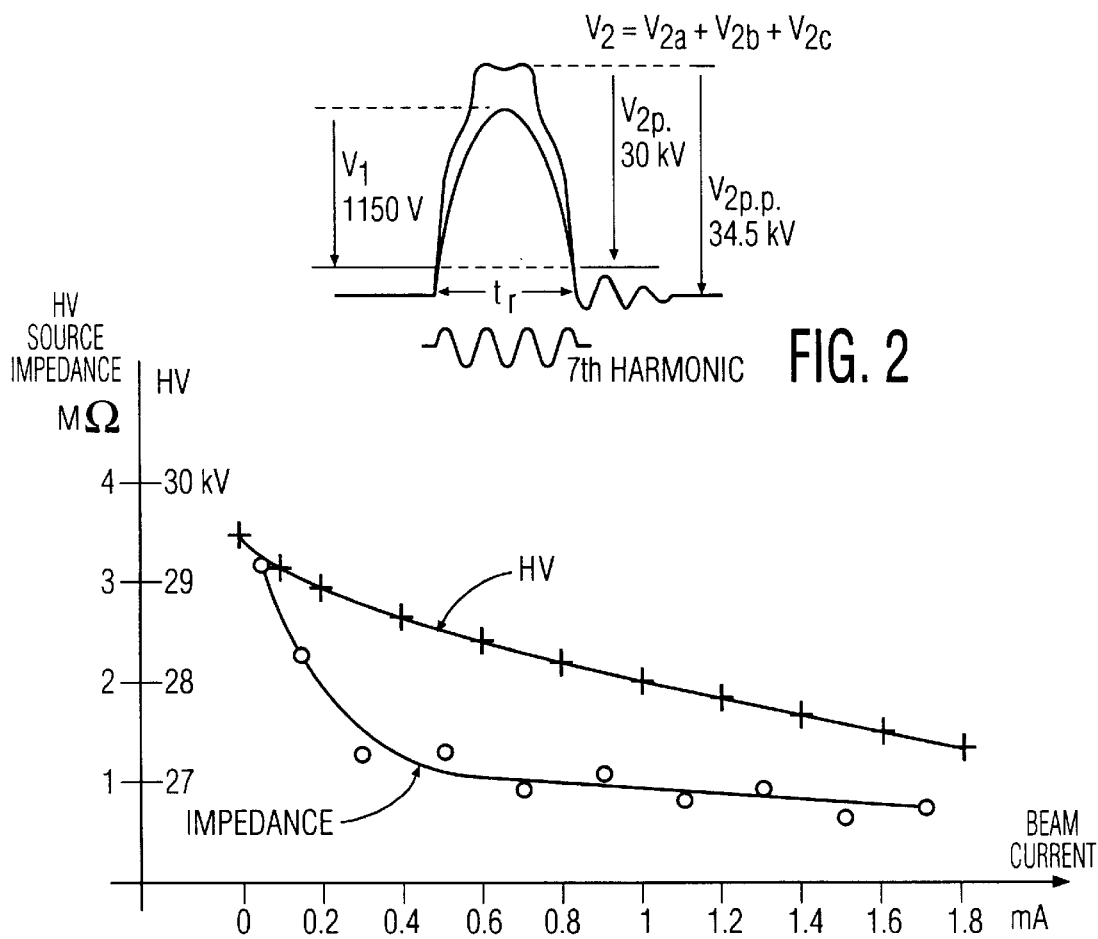
FIG. 2
FIG. 3

ZERO BEAM CURRENT

1mA BEAM CURRENT

HIGH VOLTAGE SYSTEM

BACKGROUND OF THE INVENTION

1. Field of the Invention

This invention relates to a high voltage system for color television receivers, display monitors and projectors with cathode ray tubes, and in particular, a high voltage system which indirectly tracks the ultor or anode voltage of the cathode ray tubes.

2. Description of Related Art

Variations in ultor voltage adversely affect the performance of deflection circuits. The high voltage generator of the ultor voltage exhibits an internal impedance which decreases the ultor voltage as the picture tube draws increasing beam current. Raster breathing is a form of deflection distortion caused by ultor voltage variations of the cathode ray tubes used in color television receivers, display monitors, and projectors. Raster breathing causes the horizontal width of the raster to shrink and expand as the ultor voltage varies. Other manifestations of reduced performance are reduced peak brightness and poor focus at high beam currents.

It is common practice to generate the ultor or high voltage in a flyback transformer which is part of a horizontal deflection circuit. The amplitude of the retrace pulse voltage across a primary winding and across the retrace capacitor is constant because of the regulated supply voltage B+, and the uniform line frequency and retrace time. The retrace pulse voltage can be regarded as a voltage source for the generation of the high voltage because of the high amount of circulating energy during the retrace interval in the deflection circuit and in the primary winding.

High voltage generation and rectification is often accomplished in a diode split arrangement. A secondary high voltage winding is divided into several sections of windings. High voltage diodes are coupled between the winding sections and between an upper terminal of the high voltage winding and the high voltage terminal of the flyback transformer. The retrace voltage is transformed by the turns ratio of the flyback transformer for obtaining a very high secondary retrace pulse voltage, for example 30 kV peak. The high voltage rectifiers conduct during the voltage peaks and charge the capacitor formed by the aquadag of the picture tube to the ultor voltage. The capacitance of the aquadag is typically 1500 pF to 2500 pF, depending upon picture tube size and type. The ultor voltage is loaded by the beam current of the picture tube. The average beam current is typically between 0 and 2 mA with peaks up to 20 mA.

The flyback transformer and, in particular, the split windings are constructed for obtaining a harmonic tuning which leads to ringing in the split windings. Tuning to odd harmonics produces a more square wave shaped high voltage pulse. The result is an increased conduction time of the diodes and, in turn, a lower high voltage source impedance. The high voltage source impedance shows a strong non-linearity at low beam currents, between 0 and 0.5 mA. As a result, the differential decrease of the high voltage is higher at low beam currents than at high beam currents. Deflection sensitivity is a function of ultor voltage and thus, is high voltage dependent. The non-linear high voltage source impedance produces undesirable variations in display performance, such as raster size.

It is known to obtain a sense voltage from the high voltage generator by sampling the voltage across a bleeder resistor. The sense voltage is then supplied to a high voltage control circuit or is used to limit beam current (ABL) to correct for raster breathing via an E-W correction circuit. However, variation in the sense voltage is proportional to the beam current, but not to the high voltage. This results in poor raster breathing correction because the non-linearity of the high voltage is not accounted for by the E-W correction circuit, which is linear, or the high voltage control circuit. This produces inaccurate results in high voltage regulation or E-W correction because the loading of the focus and G2 electrodes are still beam current dependent. Another disadvantage to using the bleeder resistor is that damage to the picture tube may result is there is a poor connection between the bleeder resistor and the high voltage circuit. A second independent bleeder resistor may be used, specifically to sample only the high voltage. However, this approach is expensive and consumes too much power.

SUMMARY OF THE INVENTION

Sampling of the high voltage is necessary for adequate correction. It is desirable to sample the high voltage under similar loading conditions of the high voltage for accurate high voltage regulation and raster correction. It is also desirable to sample the high voltage in an economical manner without increased power requirements.

In accordance with an inventive arrangement, the high voltage is accurately replicated under similar beam current loading conditions of the ultor voltage. A switched output circuit and a flyback transformer are coupled for generating high voltage pulses. The high voltage pulses tend to be adversely affected by beam current loading. Sample pulses are generated that track in shape and magnitude to the high voltage pulses. A correction voltage is generated responsive to the sample pulse and the correction voltage tracks the ultor voltage. The correction voltage is used for correcting raster distortion.

In accordance with another aspect of the invention, to avoid additional loading of the correction voltage, a high voltage system further comprises a means for transforming impedance. The impedance transforming means may be employed to drive the raster correcting means. This provides compensation for voltage variations due to temperature variations.

DETAILED DESCRIPTION

FIG. 1 illustrates a high voltage generator and high voltage system, according to prior art;

FIG. 2 illustrates waveforms useful in explaining the operation of the circuit of FIG. 1;

FIG. 3 illustrates the high voltage versus beam current and the source impedance versus beam current of the circuit of FIG. 1;

FIG. 1 illustrates a flyback transformer, which is part of a horizontal deflection circuit, commonly used for generating the ultor or high voltage. The amplitude of the retrace pulse voltage V1 across the primary winding W1 and across the retrace capacitor C1 is constant because of the regulated supply voltage B+, and the uniform line frequency $f_H$ and retrace time $t_r$. Voltage V1 is the voltage source for the generation of the high voltage due to the high amount of circulating energy during the retrace interval $t_r$ in the deflection circuit and in winding W1.

A diode split arrangement is often used for high voltage generation and rectification. The secondary high voltage winding is divided into several sections, shown in FIG. 1 as windings W2a, W2b and W2c. High voltage diodes are coupled between the winding sections and between the upper terminal of winding W2c and the high voltage terminal of the flyback transformer. The retrace pulse voltage V1 of 1000V peak is transformed by the turns ratio N of 30 between windings W1 and W2 to obtain a secondary retrace pulse voltage of 30 kV peak. The high voltage rectifiers conduct during the voltage peaks and charge the capacitor formed by the aquadag of the picture tube to the ultor voltage of 30 kV. The capacitance of the aquadag is 1500 pF to 2500 pF depending upon picture tube size and type. The ultor voltage is loaded by the beam current of the picture tube. The average beam current is typically between 0 and 2 mA, with peaks up to 20 mA.

The flyback transformer and, in particular, windings W2a, W2b and W2c are constructed for obtaining a harmonic tuning to the 3rd or 5th or 7th harmonic of the fundamental frequency of the retrace pulse voltage V1. The tuning to odd harmonics produces a more square wave shaped high voltage pulse. The square wave shaped voltage pulse increases the conduction time of the diodes and, therefore reduces the high voltage source impedance. FIG. 2 illustrates the waveforms with a predominance of the 7th harmonic.

FIG. 3 shows the relationship of high voltage versus beam current and the relationship of source impedance versus beam current of the circuit of FIG. 1. The high voltage source impedance shows a strong non-linearity at low beam currents, between 0 and 0.5 mA. FIG. 3 also shows that the differential decrease of the high voltage is higher at low beam currents than at high beam currents.

Referring again to FIG. 1, the low side of the high voltage winding W2a is connected to an integration capacitor C2 and a current source resistor R1. The high voltage charge current is converted to a voltage drop across current source resistor R1. The voltage is then used to limit the beam current (ABL) and to correct for raster breathing via the E-W correction circuit.

Figure 4:
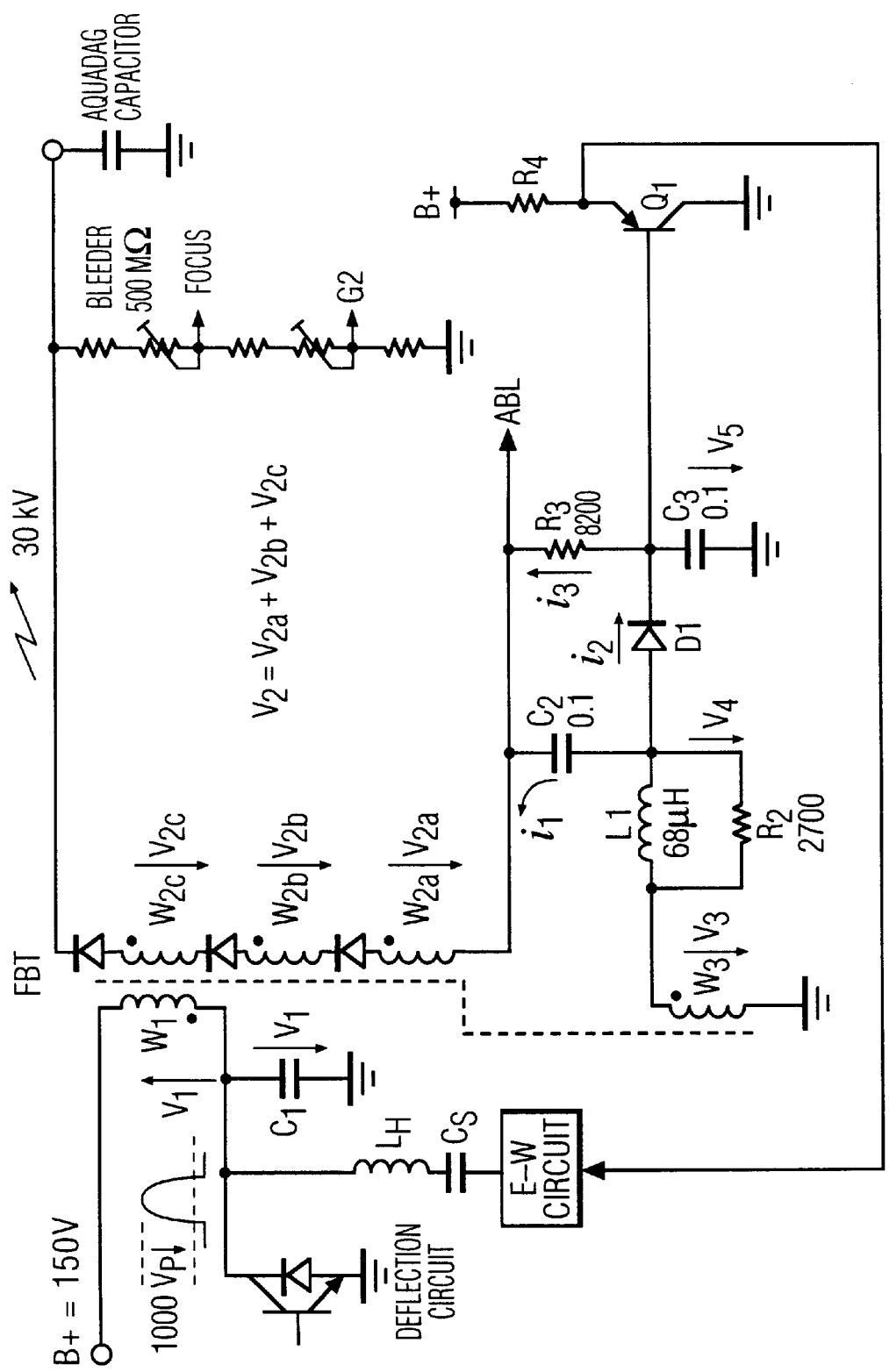
FIG. 4 illustrates a high voltage generator and high voltage system, embodying an aspect of the invention.

FIG. 4 shows the high voltage system, in accordance with the invention. The primary side of the flyback transformer is similar to the circuit of FIG. 1. The waveforms of FIG. 2 and the high voltage (HV) and impedance characteristics for FIG. 3 are also applicable to the circuit of FIG. 4. The HV retrace pulse voltage V2 shown on the waveforms was measured by placing a capacitive probe close to the upper face of the flyback transformer.

The heater winding W3 is used as voltage source for the HV replicating circuit. Coil L1 and damping resistor R2 represent the transformed leakage inductance between primary winding W1 and HV winding W2. Continuous current blocking capacitor C2 connects coil L1 to the low side of the high voltage winding W2. The AC current i1, consisting of the odd harmonics ringing current in windings W2a, W2b, and W2c and of the HV charge current, modulates the voltage across coil L1 and heater winding W3 forming the HV equivalent retrace pulse voltage V4.

FIG. 5 shows the unloaded voltage waveform of HV equivalent retrace pulse voltage V4 at different beam currents. Also shown are AC current i1 and the HV retrace pulse voltage V2. The unloaded HV equivalent retrace pulse voltage V4 is measured by connecting the anode of D1 directly to the dotted side of heater winding W3. The tuning of the unloaded HV equivalent retrace pulse voltage V4 is similar to HV retrace pulse voltage V2. At low beam currents, the shape is equivalent to the one shown in FIG. 2. At higher beam currents, portions of the 3rd and 5th harmonics are visible at the center of retrace. The modulation at higher beam currents is caused by the horizontal and vertical picture tube blanking intervals, during which the beam current is cut off.

HV equivalent retrace pulse voltage V4 is rectified by diode D1. Charge capacitor C3 represents the aquadag capacitor of the HV replicating circuit. Current i3 is equal to the beam current which discharges the aquadag capacitor. As it can be seen on FIG. 4, the equivalent circuit is series connected with the high voltage circuit. The AC circuit is completed by current blocking capacitor C2 and the DC circuit by resistor R3 (it is assumed that the ABL loading is negligibly small). Current blocking capacitor C2 couples high voltage winding W2 and heater winding W3. The high amplitude ringing current i1 modulates the voltage across coil L1 in a manner that a sum of voltages across heater winding W3 and coil L1 is equal to the transformed HV retrace pulse voltage V2. Resistor R3 closes the DC path between the high voltage generator (high voltage windings and rectifiers) and the low voltage generator (heater winding W3, coil L1, diode D1 and charge capacitor C3). The load current, which is the DC component of current i3, flows from ground through heater winding W3, coil L1, diode D1, resistor R3, windings W2a, W2b, and W2c and the anode-cathode path of the picture tube, not shown. Thus, current i3 equals the beam current and therefore, capacitor C3 is as equally loaded as the aquadag capacitor.

The HV replicating circuit produces a correction voltage V5 which is derived from a modeled high voltage pulse sample, which is rectified and loaded by the actual beam current. The two steps, forming HV equivalent retrace pulse voltage V4 and loading by current i3, produce an excellent tracking between the high voltage and the correction voltage V5. Tests conducted on a 110° SELECO color television chassis, using an ELDOR flyback transformer type 1182.0857, and incorporating a high voltage system according to the inventive arrangements taught herein, showed a tracking error smaller than 2 per mil.

FIG. 4 shows that correction voltage V5 serves as an input to an E-W correction circuit. Raster breathing correction is provided by coupling the E-W circuit to the HV replicating circuit. The operation of an advantageous example of an E-W circuit is described in more detail in U.S. Pat. No. 5,399,945 to Haferl.

Additional loading of correction voltage V5 can be avoided by employing an impedance transforming emitter follower, Q1, to drive the east-west raster correction circuit for raster breathing compensation or to control a high voltage generator. The emitter base diode of emitter follower Q1 compensates for forward voltage variations versus temperature of diode D1.

Figure 5A:
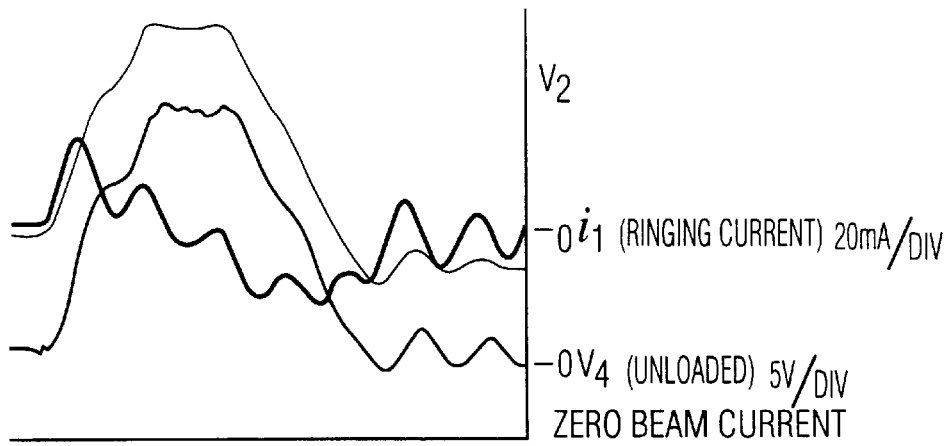
FIGS. 5A–5C illustrate waveforms useful in explaining the operation of the circuit in FIG. 4.
Figure 5B:
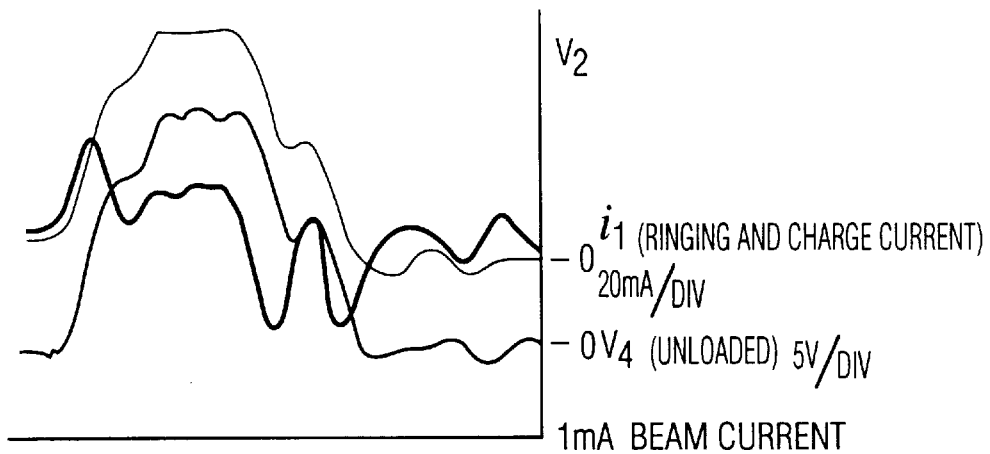
Figure 5C:
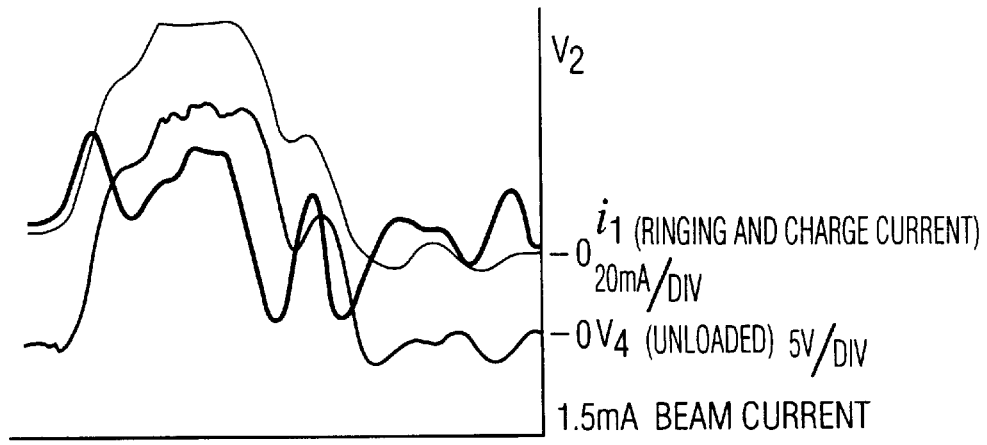
Figure 6A:
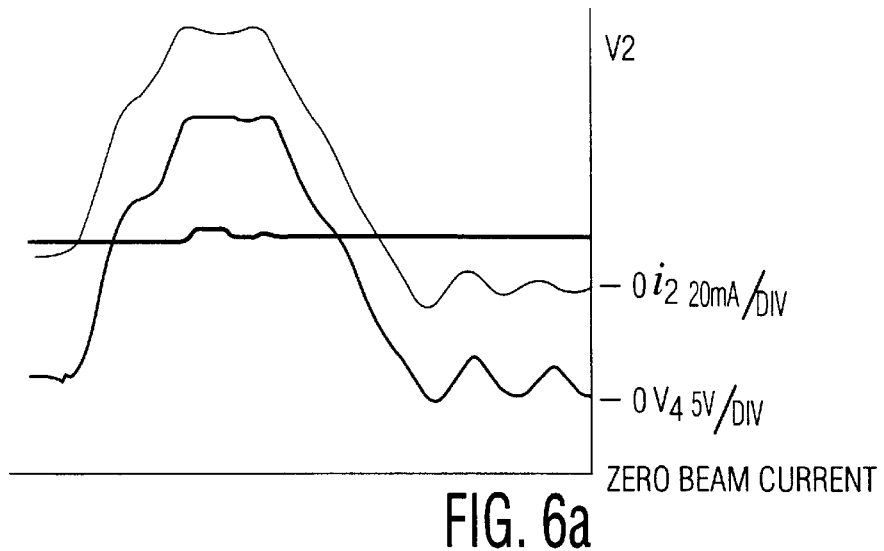
FIGS. 6A–6C illustrate waveforms useful in explaining the operation of the circuit in FIG. 4.
Figure 6B:
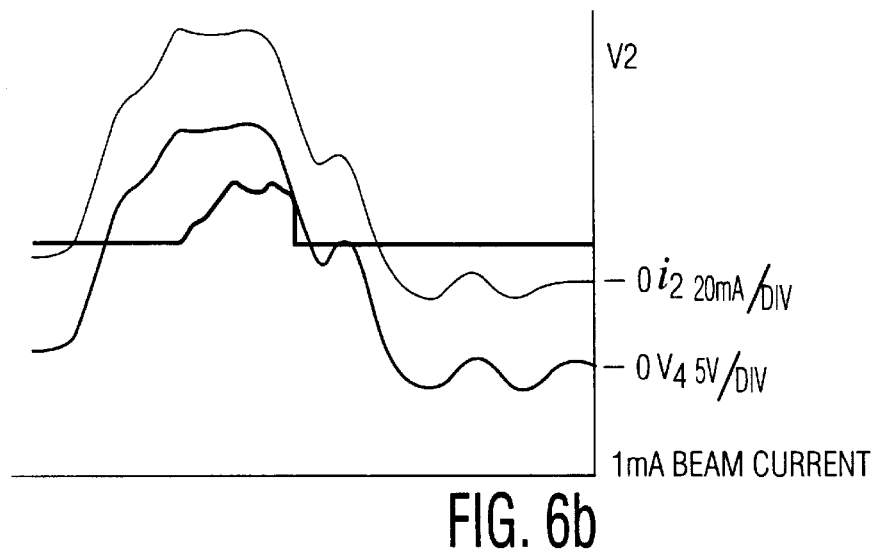
Figure 6C:
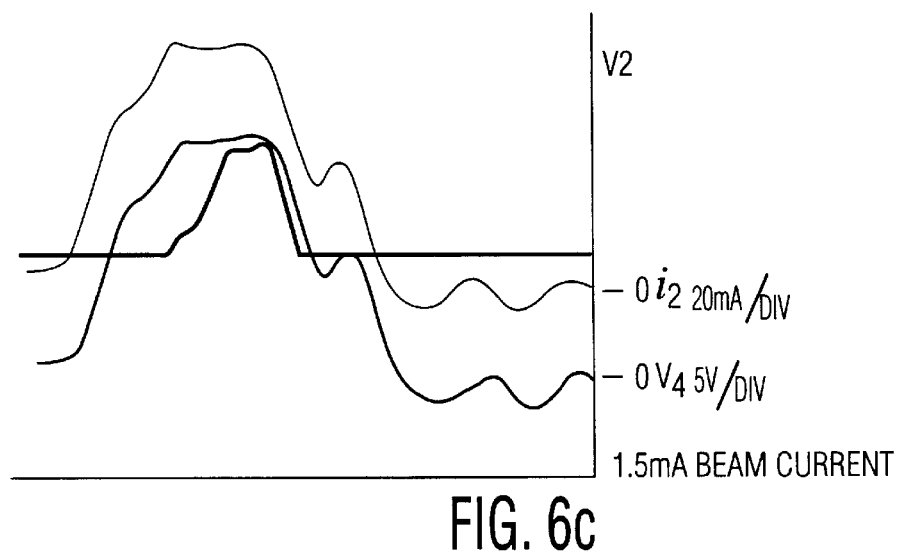

FIG. 6 shows waveforms of voltages HV retrace pulse voltage V2, HV equivalent retrace pulse voltage V4 and current i2 at different beam currents. HV equivalent retrace pulse V4 is loaded by diode D1. The series impedance formed by coil L1 and damping resistor R2 causes amplitude limitation of HV equivalent retrace pulse voltage V4. Other than the amplitude limitation, the shape of HV equivalent retrace pulse voltage V4 equals the one of HV retrace pulse voltage V2. The amplitude of HV equivalent retrace pulse voltage V4 increases during the conduction time of current i2. The shape of HV retrace pulse voltage V2 shows the same increase. This is caused by stored energy in coil L1 for HV equivalent retrace pulse voltage V4 and by stored energy in the leakage inductance of the flyback transformer for HV retrace pulse voltage V2. By comparison with the waveforms of FIG. 5, it can be noted that the conduction time and the shape of current i2 is about the same as the charge portion of current i1. AC current i1 consists of two current portions. The first current portion is the ringing current at zero beam current, as shown in FIG. 5a. The second portion is the charge current. The AC current i1, including both current portions, is shown in FIG. 5b and 5c. At zero beam current, the circuit is still loaded by a current of 0.05 ma flowing through the bleeder resistor.

Figure 7A:
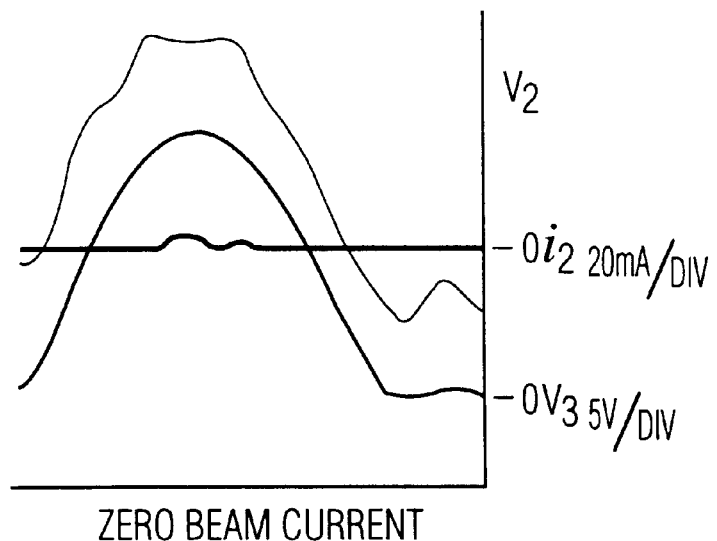
FIGS. 7A–7B illustrate waveforms useful in explaining the operation of the circuit in FIG. 4; and, FIG. 8 illustrates a high voltage generator and high voltage system, embodying another aspect of the invention.
Figure 7B:
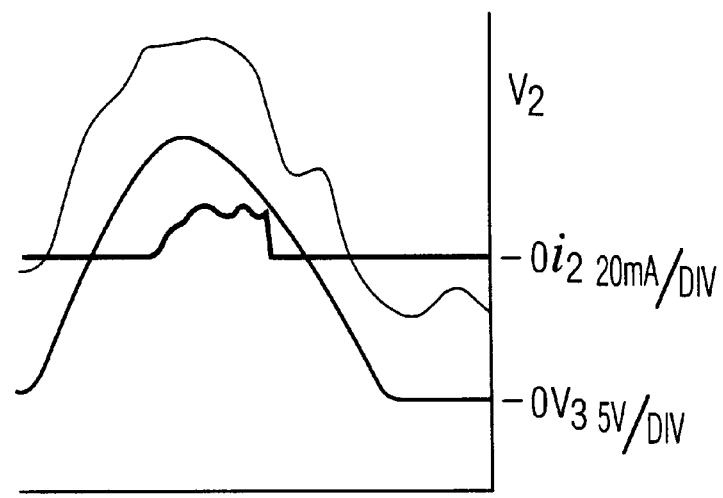

FIG. 7 shows the retrace or low voltage V3 across the heater winding W3 which acts as a voltage source for the HV replicating circuit. Also shown are current i2 and HV retrace pulse voltage V2. The shape of V3 does not change when the beam current increases. FIG. 7 shows that low voltage V3 does not track in shape to the HV retrace pulse voltage V2. Consequently, low voltage V3 does not track in shape to the HV equivalent retrace pulse voltage V4, because the shapes of V2 and V4 are equal. The peak voltage of the unloaded HV equivalent retrace pulse voltage V4, as shown in FIG. 5, is also higher than the peak voltage of V3 due to stored energy in coil L1 generated by ringing current i1. Therefore, low voltage V3 does not track in magnitude to the HV equivalent retrace pulse voltage V4.

The tuning of the high voltage retrace pulse results from the leakage inductance between windings W2 and W1 and from the capacitance between the windings. The measured leakage inductance (W1 short circuit and W2 forward polarized by 0.3 mA via 330 k-Ohm) of the flyback transformer is 50 mH.

The equivalent circuit and the high voltage circuit are loaded by the beam current. Accordingly, the leakage inductance is transformed by the winding ratio of winding W2 to heater winding W3 to obtain the value of coil L1. This value of coil L1 must be doubled because the energy stored in L1 by the ringing portion of current i1 is loaded by the charge current i2 and the charge portion of current i1.

Therefore, the calculation of L1 is as follows:

$$L1 = 2 \times 50\ mH/1500 = 67\ \mu H.$$

The damping resistor R2 limits the ringing voltage across L1 and serves for tracking fine tuning.

Resistor R3 acts as a current—voltage converter to obtain the ABL voltage. R3 also isolates current blocking capacitor C2 from charge capacitor C3.

Charge capacitor C3 is selected for best breathing compensation. The value of charge capacitor C3 is generally smaller than the transformed aquadag capacitance to obtain a faster response time of correction voltage V5. This compensates for the rather long time constant of raster size variations.

Figure 8:
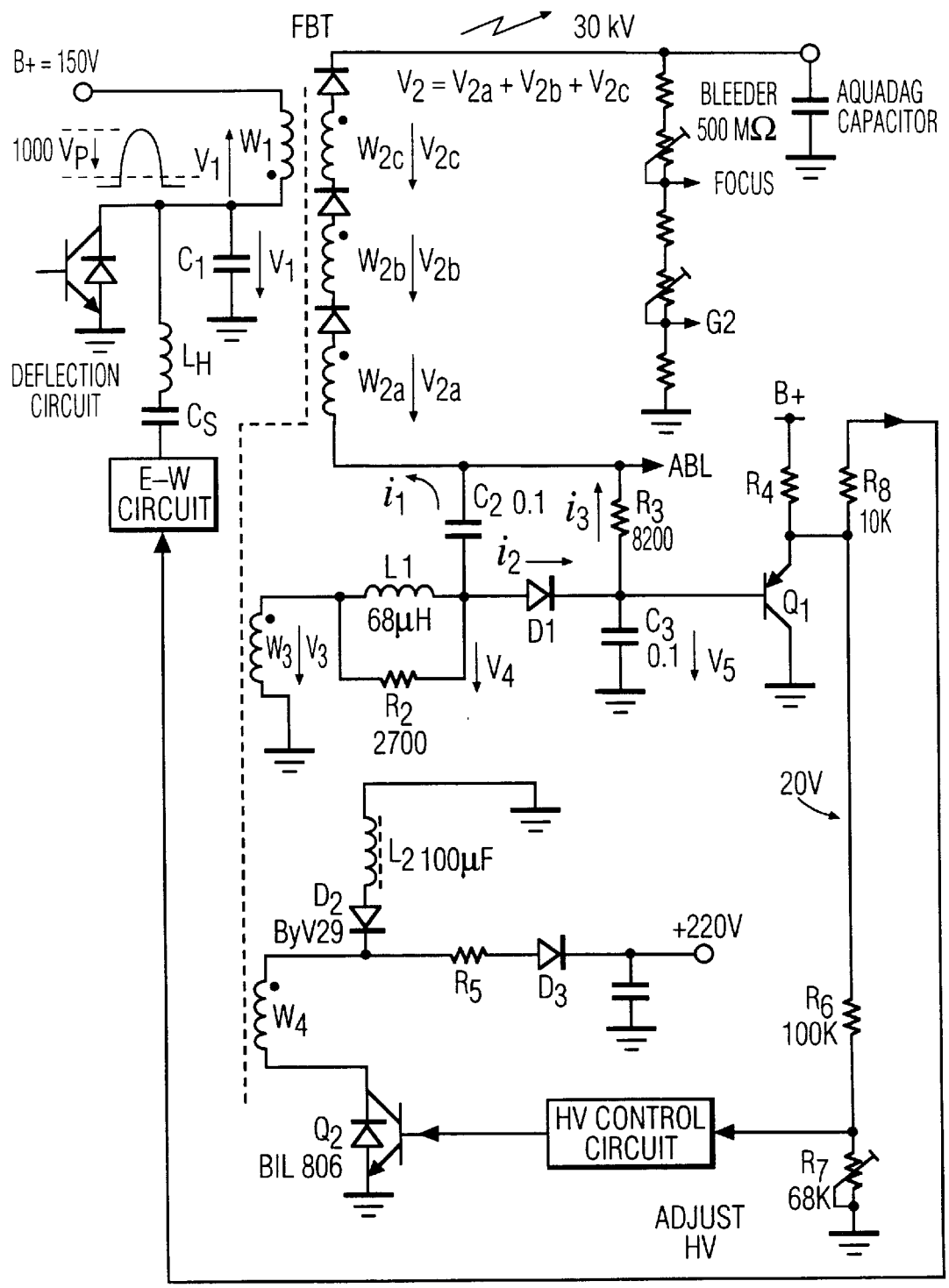

FIG. 8 illustrates a high voltage system embodying another aspect of the invention. FIG. 8 shows the correction voltage V5 serving as an input to a high voltage regulator. The high voltage circuit is similar to the circuit of FIG. 4. The waveforms of FIGS. 2, 3, 5, 6, and 7 are also applicable to FIG. 8. The operation of an. advantageous example of a high voltage regulator is described in more detail in U.S. Pat. No. 5,266,871 to Haferl.

What is claimed is:
1. A high voltage system, comprising:
   a switched output circuit and a flyback transformer coupled for generating high voltage pulses, said high voltage pulses establishing an ultor voltage tending to be adversely affected by beam current loading;
   means coupled to said flyback transformer and responsive to a flyback pulse for generating sample pulses tracking in shape and magnitude to said high voltage pulses with beam current loading, said sample pulse generating means comprising a series impedance network, wherein said impedance network comprises an inductor and a resistor;
   means for generating a correction voltage responsive to said sample pulses that tracks said ultor voltage; and
   means for correcting raster distortion responsive to said correction voltage.
2. The circuit of claim 1, wherein said correction voltage generating means comprises a rectifier.
3. The circuit of claim 2, wherein said correction voltage generating means further comprises a filter coupled to an output of said rectifier.
4. The circuit of claim 1, further comprising means for AC coupling said series impedance network to said high voltage winding.
5. The circuit of claim 1, further comprising means for transforming an impedance responsive to said correction voltage generating means and coupled to said raster correcting means.
6. The circuit of claim 5, wherein said transforming means comprises a transistor.
7. The circuit of claim 5, wherein said transforming means compensates for temperature variations due to voltage variations in said correction voltage generating means.
8. A high voltage system, comprising:
   a horizontal output circuit and a flyback transformer having a primary winding, a high voltage winding and a low voltage winding, said horizontal output circuit and said flyback transformer coupled for generating high voltage pulses establishing an ultor voltage tending to be adversely affected by beam current loading;
   means including an impedance coupled to said low voltage winding for generating sample pulses corresponding in shape and proportional in magnitude to said high voltage pulses;
   means for AC coupling said impedance to said high voltage winding;
   means for generating a rectified voltage responsive to said sample pulses that tracks said ultor voltage;
   means for DC coupling said rectified voltage to said high voltage winding; and,
   means for correcting raster distortion responsive to said rectified voltage.
9. The circuit of claim 8, wherein said AC coupling means comprises a capacitor.
10. The circuit of claim 8, wherein said rectified voltage generating means comprises a rectifier and a filter.
11. The circuit of claim 8, wherein said DC coupling means comprises a resistor.
12. A high voltage system, comprising:
    a switched output circuit and a pulse transformer coupled for generating high voltage pulses establishing an ultor voltage, said high voltage pulses and said ultor voltage varying nonlinearly relative to variations in beam current loading over a range extending between low and high beam current levels;

means coupled to said pulse transformer and responsive to pulses therein for generating nonlinearly varying sample pulses that vary in a correspondingly nonlinear manner relative to variations in beam current loading so as to track said nonlinearly varying high voltage pulses; and, means responsive to said nonlinearly varying sample pulses for generating a correction voltage that varies nonlinearly relative to said variations in beam current loading, so as to track the nonlinear variations of ultor voltage with beam current variations over said range of beam current levels.

13. The circuit of claim 12, wherein said correction voltage generating means further comprises means for loading said correction voltage by said beam current to provide the ultor voltage tracking.

14. The circuit of claim 13, wherein said loading means is a resistor coupled to a low end of a high voltage winding of said pulse transformer.

15. The circuit of claim 12, further comprising means for correcting raster distortion responsive to said correction voltage.

16. The circuit of claim 15, wherein said raster correcting means comprises an East-West correction circuit.

17. The circuit of claim 15, wherein said raster correcting means comprises a high voltage regulator.

18. The circuit of claim 15, wherein said raster correcting means comprises a high voltage regulator and an East-West correction circuit.

19. The circuit of claim 15, wherein said raster distortion is raster breathing.

20. The circuit of claim 12, wherein said sample pulse generating means comprises an inductor.

21. The circuit of claim 12, wherein said sample pulse generating means comprises a low voltage pulse source coupled to a coil and a capacitor coupled to said coil and to the low end of a high voltage winding of said pulse transformer.

22. The circuit of claim 12, further comprising an ABL terminal coupled to said correction voltage.

23. A high voltage system, comprising:

a horizontal output circuit and a flyback transformer having a primary winding, a high voltage winding and a low voltage pulse source, said horizontal output circuit and said flyback transformer coupled for generating high voltage pulses establishing an ultor voltage tending to be adversely affected by beam current loading;

means including an impedance coupled to said low voltage pulse source for generating sample pulses corresponding in shape and proportional in magnitude to said high voltage pulses;

means for AC coupling said impedance to said high voltage winding;

means for generating a rectified voltage responsive to said sample pulses that tracks said ultor voltage;

means for DC coupling said rectified voltage to said high voltage winding; and, means for correcting raster distortion responsive to said rectified voltage.

* * * * *